(No Model.) 3 Sheets—Sheet 1.

W. R. KINNEAR.
METALLIC CEILING.

No. 424,313. Patented Mar. 25, 1890.

WITNESSES

INVENTOR
William R. Kinnear
Attorneys (No Model.) 3 Sheets—Sheet 2.

W. R. KINNEAR.
METALLIC CEILING.

No. 424,313. Patented Mar. 25, 1890.

WITNESSES
James M. Swant
Charles W. Forret

INVENTOR
William R. Kinnear
per Murdock & Murdock
Attorneys (No Model.) 3 Sheets—Sheet 3.

W. R. KINNEAR.
METALLIC CEILING.

No. 424,313. Patented Mar. 25, 1890.

UNITED STATES PATENT OFFICE.

WILLIAM R. KINNEAR, OF COLUMBUS, OHIO.

METALLIC CEILING.

SPECIFICATION forming part of Letters Patent No. 424,313, dated March 25, 1890.

Application filed November 15, 1889. Serial No. 330,378. (No model.)

*To all whom it may concern:*

Be it known that I, WILLIAM R. KINNEAR, a citizen of the United States, and a resident of Columbus, in the county of Franklin and State of Ohio, have invented new and useful Improvements in Metallic Ceilings, of which the following is a full and exact description, reference being had to the accompanying drawings, in which—

Figure 1:
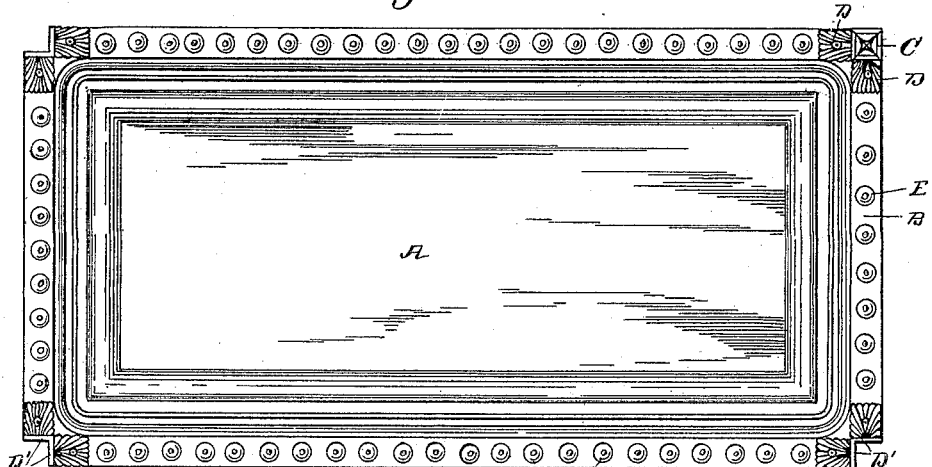
Figure 2:
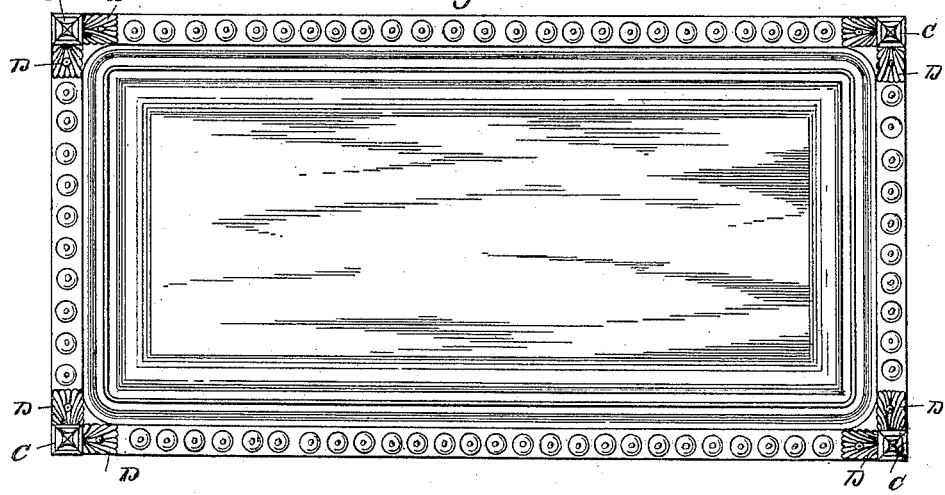
Figure 3:
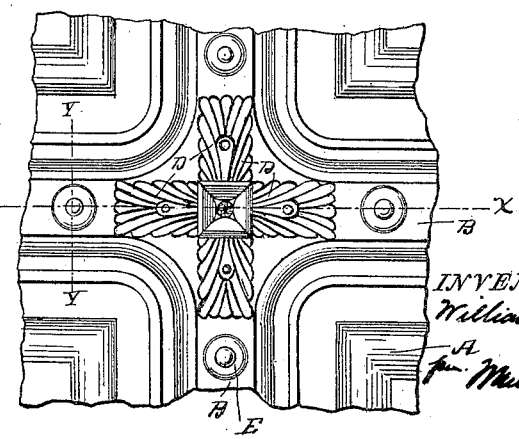
Figure 4:
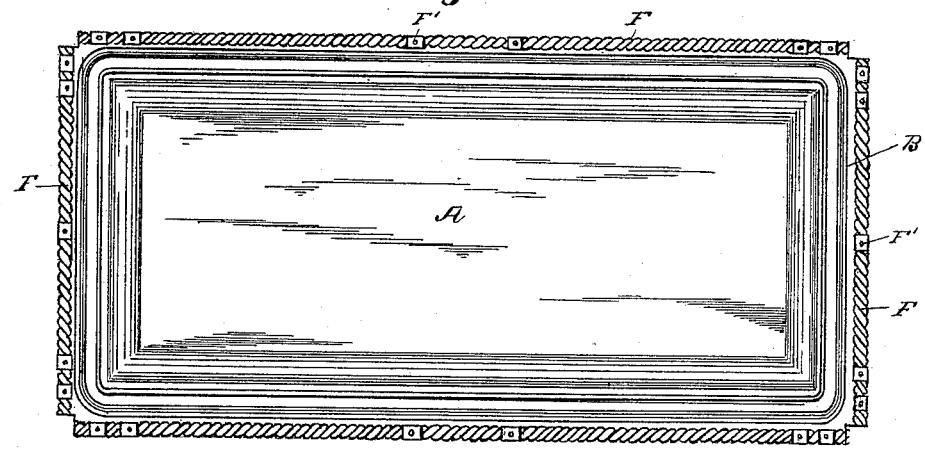
Figure 5:
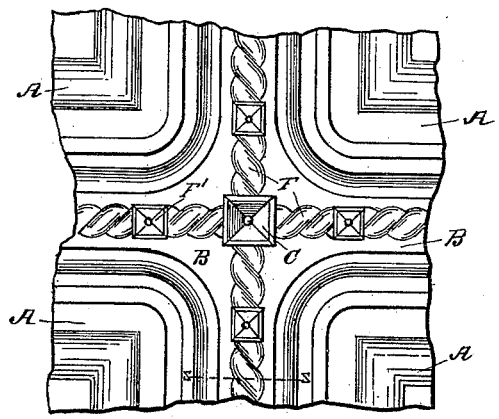
Figure 6:
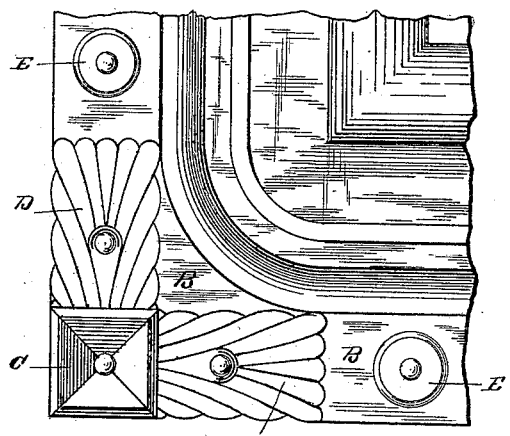
Figure 7:
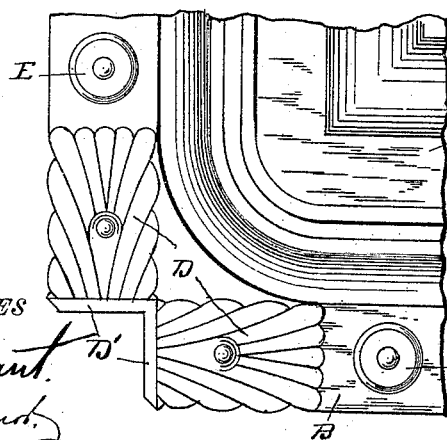
Figure 8:
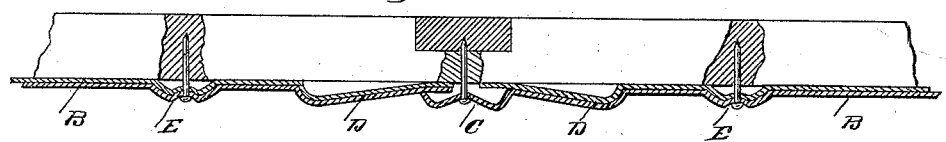
Figure 9:
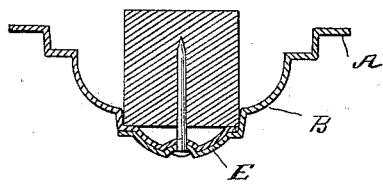
Figure 10:
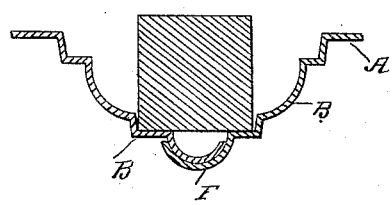

Figure 1 is a plan view of one of the panels composing the ceiling, the rosettes on three corners being omitted. Fig. 2 is a plan view of one of the panels provided with a rosette at all corners. Fig. 3 is a plan view of the junction of two rails of the ceiling formed by the panels shown at Figs. 1 and 2. Fig. 4 is a plan view of a panel, showing a modified form of the application of the invention. Fig. 5 is a plan view of the junction of two rails of the ceiling formed by the panels shown in Fig. 4. Fig. 6 is a detail view in plan of a corner of the panel bearing a rosette. Fig. 7 is a detail view in plan of a corner of the panel not bearing a rosette. Fig. 8 is a section through one of the rails on the line $x\ x$ in Fig. 3. Fig. 9 is a cross-section of one of the rails on the line $y\ y$ in Fig. 3. Fig. 10 is a cross-section of one of the rails on the line $z\ z$ in Fig. 5.

The principal elements of which the class of ceilings to which this invention relates are the panel A, the rails B, and the rosettes C.

In forming the ceiling of metal or other sheet material the object to be attained is to disguise or conceal all joints in the completed work. In the ceiling invented by and for which a patent was granted to me the 21st day of August, 1888, No. 388,285, I form rounded inner corners at the junction of the rails on the sides of the panels. In that construction the edges of the lapping margins forming the rails are exposed from the beginning of the rounded corner to the side of the rosette. This raw edge, crossing, as it does, the flat surface of the rail, makes an ill-appearing joint and one easily distinguishable and hard to disguise by the ordinary means of paint and its accessories. It is to cure this defect in the appearance of these ceilings, and at the same time to obviate a difficulty in the manufacture, as hereinafter set forth, that I introduce the molding D. The molding D is raised on the rail next to the rosette C and extends over the rail to or near where the said rounded corners begin. This molding is so constructed as to present a fluted or otherwise irregular edge on the side where it crosses the flat portion of the rail, as set forth. This line, corresponding, as it does, with others of the moldings about the rosette, conceals by disguising the joint. In the manufacture of these panels, in which the margins are raised above the body of the panels from one piece to both sides of the corner of the sheet, the metal has a tendency to pucker, being drawn by the press in both directions across the panel. By the insertion of the molding D at these points the pucker is drawn out as the surplus material is taken up thereby to fill out the design. This I find of great advantage, as it relieves the press of the extra strain at those points.

As an adjunct to the molding D, I form at one and the same operation the rosettes C. To save material and to prevent the labor of suspending the ceiling becoming impeded by the interference of too many like parts, I omit the rosettes at all but one corner and place in their stead the flanges D', over which the rosette laps in being placed in position. Through the center of the rosette C is a perforation to receive a fastening, the head of which is arranged to harmonize and enter into the design of this feature. By this means are the corners rendered firm and solid.

In the panel shown in drawings I have dispensed with the returned outer edge of the margins, as is the case in the patent above referred to. The purpose of that returned edge was to guide the operator in maintaining the lines of the rails of his ceiling. In this present invention I provide for that purpose the molding E, which acts as a guide, while rendering the margins rigid.

As a further application of my invention, I have shown at Figs. 4, 5, and 10 the same as applied to the whole margin of the panel instead of to the corners alone. In this panel the margins of the panels are edged with the decorated bead F, the outer edge of which is so indented as to produce, where it rests on the margins of the adjoining panels, a fluted or broken line. In suspending this ceiling only the beads F are lapped, as shown in Fig. 10. At the intervals along this edging are provided the depressed squares F', which rest on the structure to which the panels are fastened. Through the centers of these squares are driven the fastenings for suspending the ceiling, while the heads form the center dots of the same. Of course the designs of this bead or edge F may be changed indefinitely and yet retain the essential feature of my invention, which is to form a close joint with the margins of the adjoining panels, while presenting a broken line toward the point of observation. With this panel I may use either the rosette integral with the panel, as shown in Figs. 1 and 2, or that heretofore described by me in the patent hereinbefore mentioned.

This ceiling is suspended as described in the patent above referred to, and it is thought unnecessary to further describe the operation here.

What I claim is—

1. In a metallic ceiling such as described, a panel provided with a continuous raised margin, at the corners of which are provided rosettes, substantially as described.

2. In a metallic ceiling such as described, the combination of a panel, a raised margin, and ornaments rigidly attached to the margins at one or more corners thereof, substantially as described.

3. In a metallic ceiling such as described, the combination of a panel, a raised margin, the inner corners of which are turned, and ornament rigidly attached to the said margin near the corners thereof, adapted to rest its outer edge on the plane of the margin of an adjoining panel, substantially as described.

4. In a metallic ceiling such as described, the combination of a panel and a raised margin, the inner corners of which are turned and the outer edge fluted or otherwise decorated where it crosses the plane of the adjoining margins, substantially as described.

5. In a metallic ceiling such as described, the combination of a panel, raised margins attached thereon, and an ornamental edging on the said margin, the outer edge resting on the margins of the adjoining panels, substantially as described.

6. In a metallic ceiling such as described, a panel provided with raised margins, the outer edges on two sides of which are ornamented to present fluted or broken lines where they rest on the margin of the adjoining panels, substantially as described.

7. In a metallic ceiling such as described, the combination of a panel provided with raised margins, the outer edges on two sides of which are ornamented to present fluted or broken lines where they rest on the margins of the adjoining panels, and fastenings adapted to drive through the said ornamental edges, the exposed parts of which enter into and become a part of the design thereof, substantially as described.

8. In a metallic ceiling such as described, the combination of the panel A, the rails B, formed by lapping margins of the said panels and recessed at the corners for the insertion of a rosette, the ornamental edge F, and the rosettes G, substantially as described.

9. In a metallic ceiling such as described, the combination of the panel A, the rail B, formed by lapping margins of the panels, and rosettes C, rigidly attached to the said margins at the junction thereof, substantially as described.

10. In a metallic ceiling such as described, the combination of the panel A, the rail B, formed by lapping margins of the said panels, the molding D, rigidly attached to the said margins, and the rosette C, substantially as described.

In testimony whereof I have hereunto set my hand this 29th day of October, A. D. 1889.

WILLIAM R. KINNEAR.

Witnesses:
J. W. YOST,
L. T. STRADER.